United States Patent
Ali et al.

(10) Patent No.: US 8,359,422 B2
(45) Date of Patent: Jan. 22, 2013

(54) SYSTEM AND METHOD TO REDUCE TRACE FAULTS IN SOFTWARE MMU VIRTUALIZATION

(75) Inventors: Qasim Ali, West Lafayette, IN (US); Raviprasad Mummidi, Mountain View, CA (US); Kiran Tati, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 631 days.

(21) Appl. No.: 12/492,766

(22) Filed: Jun. 26, 2009

(65) Prior Publication Data

US 2010/0332910 A1 Dec. 30, 2010

(51) Int. Cl.
*G06F 12/00* (2006.01)
*G06F 13/00* (2006.01)
*G06F 13/28* (2006.01)

(52) U.S. Cl. .................. 711/6; 711/159; 711/203; 718/1
(58) Field of Classification Search .................. 711/159, 711/203, 6; 718/1
See application file for complete search history.

(56) References Cited

U.S. PATENT DOCUMENTS

| | | | |
|---|---|---|---|
| 6,446,186 B1 | 9/2002 | Priem et al. | |
| 6,651,132 B1* | 11/2003 | Traut | 711/6 |
| 7,467,285 B2* | 12/2008 | Khosravi et al. | 711/206 |
| 2011/0082962 A1* | 4/2011 | Horovitz et al. | 711/6 |

OTHER PUBLICATIONS

U.S. Appl. No. 12/246,402, filed Oct. 6, 2008, entitled "System and Method for Maintaining Memory Page Sharing in a Virtual Environment", by Agesen, et al., 41 pages.

* cited by examiner

*Primary Examiner* — Stephen Elmore
*Assistant Examiner* — Mark Giardino, Jr.

(57) ABSTRACT

A system for identifying an exiting process and removing traces and shadow page table pages corresponding to the process' page table pages. An accessed minimum virtual address is maintained corresponding to an address space. In one embodiment, whenever a page table entry corresponding to the accessed minimum virtual address changes from present to not present, the process is determined to be exiting and removal of corresponding trace and shadow page table pages is begun. In a second embodiment, consecutive present to not-present PTE transitions are tracked for guest page tables on a per address space basis. When at least two guest page tables each has at least four consecutive present to not-present PTE transitions, a next present to not-present PTE transition event in the address space leads to the corresponding guest page table trace being dropped and the shadow page table page being removed.

18 Claims, 8 Drawing Sheets

| GUEST PAGE TABLE 1 652 | |
|---|---|
| PTE 658 | P/NP 660 |
| | |
| | |
| | |
| | |

| GUEST PAGE TABLE 2 654 | |
|---|---|
| PTE 664 | P/NP 666 |
| | |
| | |
| | |
| | |

| GUEST PAGE TABLE 674 | X CONSECUTIVE? 676 |
|---|---|
| 1 | T |
| 2 | T |
| | |

FIG. 6

SYSTEM AND METHOD TO REDUCE TRACE FAULTS IN SOFTWARE MMU VIRTUALIZATION

FIELD OF THE INVENTION

This invention relates generally to the field of memory management in computer systems and, more specifically, to freeing memory resources in a virtualized system.

BACKGROUND OF THE INVENTION

As the instructions and data for an application running in a computer system are loaded into system memory before being executed, performance is generally improved if there is more memory available to support any active applications. Indeed, an application requiring real-time processing of complex calculations such as voice-recognition software, interactive graphics, etc., will not run properly at all unless a certain amount of RAM (Random Access Memory) is reserved for its use.

An application may be defined broadly as any body of code that is loaded and that executes substantially as a unit. Applications include word processing programs, spreadsheets and games; Internet browsers and e-mail programs; software drivers; web servers; and software implementations of a whole computer, commonly known as a "virtual machine" (VM).

High-speed system memory (RAM) is a limited resource and, as with most limited resources, there is often competition for it. This has become an even greater problem in modern multi-tasked systems, e.g., virtualized systems, in which several applications may be running, or at least resident in memory, at the same time. More efficient management of RAM can reduce the cost, energy, or physical space required to support a given workload. Alternatively, more efficient management of RAM can allow a system to support a larger number of applications with better performance, given a fixed monetary, energy, or physical space budget.

In almost all computer systems, and as known to one of ordinary skill in the art, an operating system provides an application with a virtual memory that appears, to the application, as contiguous working memory, while in fact it may be physically fragmented and may even overflow on to disk storage. The operating system keeps mappings of virtual page numbers to physical page numbers stored in page tables as page table entries (PTEs). Almost all implementations use page tables to translate the virtual addresses seen by the application into physical or machine addresses used by the hardware to process instructions. This technique makes programming of large applications easier and uses real physical memory (RAM) more efficiently than those without virtual memory. All modern x86 CPUs include a memory management unit (MMU) and a translation lookaside buffer (TLB) to optimize virtual memory performance.

There may be one page table per system or a separate page table may be provided for each application. If there is only one page table, running applications share a single virtual address space, i.e., they use different parts of a single range of virtual addresses. Systems that use multiple page tables provide multiple virtual address spaces—concurrent applications think they are using the same range of virtual addresses, but their separate page tables redirect to different real, i.e., machine, addresses.

In a virtualized system, such as those available from VMware, Inc. of Palo Alto, Calif., in order to run multiple virtual machines on a single system, another level of memory virtualization is required. In other words, one has to virtualize the MMU to support the guest OS. The guest OS continues to control the mapping of virtual addresses to the guest memory physical addresses by creating and maintaining guest page tables, but the guest OS typically does not have any control or knowledge of mappings to the actual machine memory. A Virtual Machine Monitor (VMM), or other virtualization software or logic, is responsible for mapping guest physical memory to the actual machine memory. The VMM creates and maintains shadow page tables containing mappings from virtual addresses to machine addresses. The mappings in the shadow page tables are typically derived from guest OS mappings in the guest page tables and the VMM's mappings from guest physical memory to the actual machine memory. As known, the guest page tables may be "protected" by memory traces and the VMM intercepts any attempt to access the guest page tables by operation of the traces. Any access to the protected guest page tables results in a "tracing fault" that is handled by the VMM. A hardware MMU typically uses the shadow page tables and a TLB to map the virtual memory directly to the machine memory, so that the two levels of translation are not necessary on every access. When the guest OS changes the virtual memory to physical memory mapping in the guest page tables, the VMM updates the shadow page tables to enable a direct lookup by the MMU.

The MMU virtualization creates some overhead for all virtualization approaches, e.g., additional processing of virtual addressing, page table management, paging, etc. The VMM is not precisely aware of when the guest finishes using a page as a page table page. The VMM, however, can benefit from having this information to remove the traces to eliminate its costs as well as to free the shadow page table page corresponding to the guest page table page in the shadow-based MMU virtualization. Thus, any methods or systems that can free up the memory related to the shadow page table pages and/or traces are desirable as this can reduce latency, increase speed and increase efficiency.

SUMMARY OF THE INVENTION

In a virtualized system using traces and shadow page tables, a system and method are provided for recognizing when a process is about to exit and the traces and shadow page table pages corresponding to the exiting process' guest page table pages can be removed to reduce the trace costs and memory overhead.

In one embodiment, a minimum virtual address, accessed in a process' context, is maintained corresponding to an address space. Whenever a page table entry corresponding to the minimum virtual address changes from present to not present, the corresponding trace and also the shadow page table page are removed.

Alternately, in accordance with a second embodiment of the present invention, consecutive present to not-present PTE transitions are tracked for guest page tables on a per address space basis. This data is then used to identify an address space that is being destroyed, e.g., written over with all zeroes, as a corresponding application or context is ending. When, for example, each of at least two (2) guest page tables has at least four (4) consecutive present to not-present PTE transitions, a flag is set identifying the potential destruction of the address space. Once it is determined that the address space could be in the process of being destroyed, i.e., the flag has been set, any further present to not-present PTE transition events in the address space lead to the trace being dropped on the guest page table corresponding to the shadow page table incurring the event.

BRIEF DESCRIPTION OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures:

FIG. 6 is a block diagram in accordance with another embodiment of the present invention;

DETAILED DESCRIPTION

Advantageously, embodiments of the present invention provide for recognizing when a process is about to exit in order to remove the traces and shadow page table pages corresponding to the exiting process' page table pages to reduce the trace costs and memory overhead.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced, or of being carried out, in various ways. Examples of specific implementations are provided herein for illustrative purposes only and are not intended to be limiting. Particular acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

The term "context" is used here to refer to any software or hardware component, device or system, that addresses and reads from the hardware memory and that has its own address translation (mapping) state. For a traditional OS, a "context" would typically be a "process," which has an address space and associated page tables that contain information about how to map virtual pages to physical pages, and also page-level protection information, such as "read-only" for copy-on-write (COW) pages.

As will become clear from the description below, embodiments of the present invention do not require any particular hardware platform. Nonetheless, because it is so common, and by way of example only, it is assumed below that an x86 architecture, e.g., as used in the Intel IA32 line of microprocessors, is being used.

As is well known, system memory is typically divided into individually addressable units, commonly known as "pages," each of which in turn contains many separately addressable data words, which in turn will usually comprise several bytes. Pages are identified by addresses commonly referred to as "page numbers." Embodiments of the present invention do not presuppose any particular page size. Any memory unit may be used and will require little or no modification of the embodiments of the invention described below.

Figure 1:
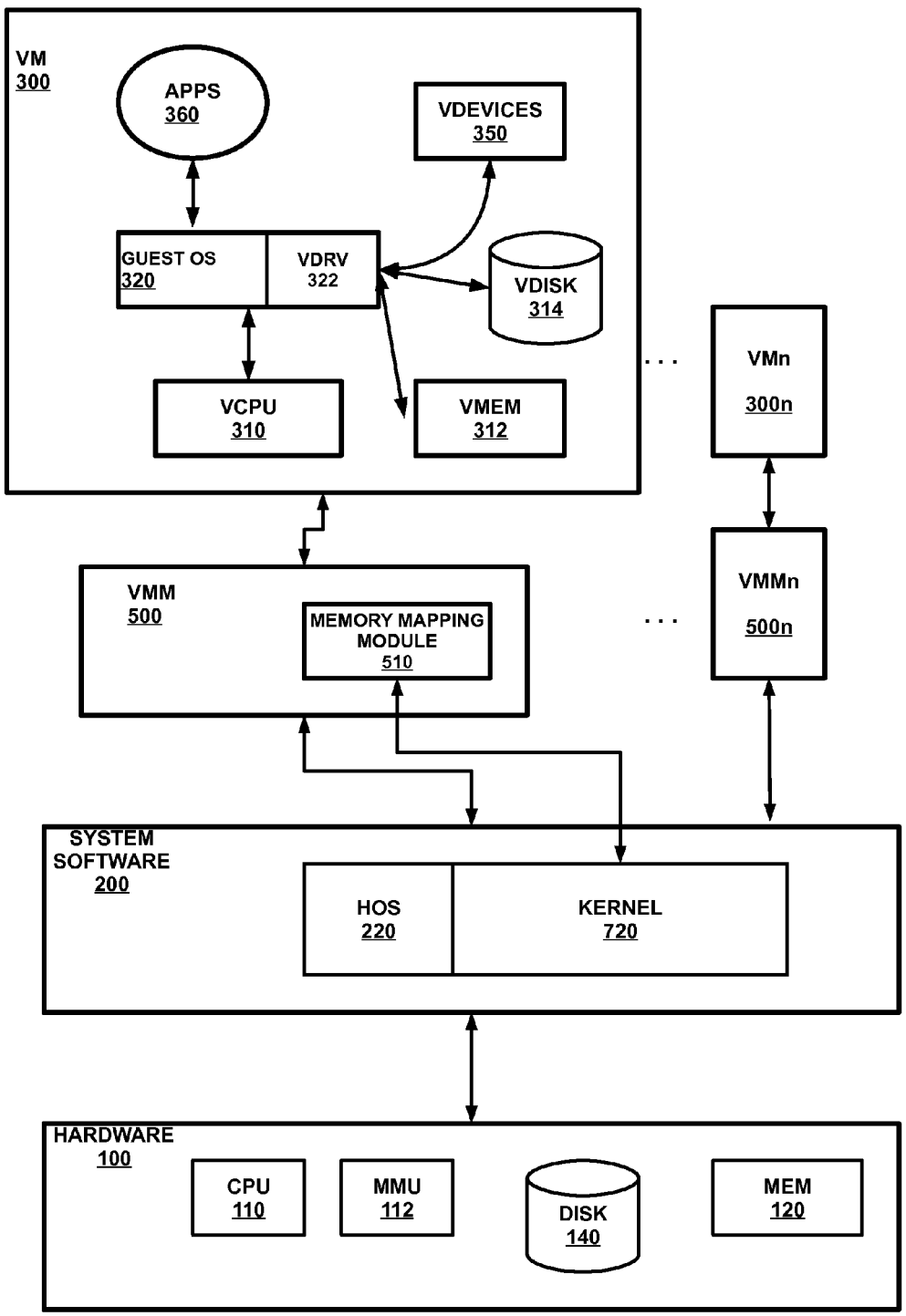
FIG. 1 is a block diagram of a system in which embodiments of the present invention may be implemented.

Referring now to FIG. 1, a representation of a virtualized system will be described in order to subsequently describe embodiments of the present invention. System hardware 100 includes a central processor (CPU) 110, which may be a single processor, or two or more cooperating processors in a known multiprocessor arrangement. As in other known systems, the hardware includes, or is connected to, conventional registers, interrupt-handling circuitry, and a memory management unit MMU 112. The MMU 112 is usually integrated on-chip in modern CPUs and uses page table information that is established by the system software. A storage device 140, e.g., a disk drive, and memory 120, for example, RAM, are provided.

As in other computer systems, system software 200 includes a host operating system (HOS) 220, and drivers as needed for controlling and communicating with various devices and the system hardware 100. Embodiments of the present invention do not presuppose any particular host operating system, and because the characteristics and functions of operating systems are so well known, the HOS 220 need not be discussed in greater detail.

At least one virtual machine (VM) 300, . . . , 300n, is installed to run as a Guest on the host system hardware and software. As is well known in the art, a VM is a software abstraction—a "virtualization"—of an actual physical computer system. As such, each VM 300 will typically include one or more virtual CPUs 310 (VCPU), a Guest Operating System 320 (Guest OS) (which may, but need not, be a copy of a conventional, commodity OS), a virtual system memory 312 (VMEM), a virtual disk 314 (VDISK), virtual peripheral devices 350 (VDEVICES) and drivers 322 (VDRV) for handling the virtual peripheral devices 350, all of which are implemented in software to emulate components of an actual or physical computer. Although the key components of only one VM 300 are illustrated in FIG. 1, the structure of any other VM may be essentially identical.

Most computers are intended to run various applications, and VMs are no exception. Consequently, by way of example, as shown in FIG. 1, a group of applications 360 (which may be a single application) is installed to run at user level on the Guest OS 320; any number of applications, including none at all, may be loaded for running on the Guest OS, limited only by the capacity or requirements of the VM. In some virtualization systems, an application (or a user of the application) will not "know" that it is not running directly on "real" hardware. As known to one of ordinary skill in the art, the applications and the components of the virtual machine 300 are instructions and data stored in memory, just as any other software. The concept, design and operation of virtual machines are well known in the field of computer science.

Virtualization software operates as an interface between a VM and the combination of the underlying "real" OS 220 and the hardware 100. As functionality of the virtualization software may alternatively be implemented in hardware or firmware, a more general term for this functionality is "virtualization logic." The OS 220 is real in the sense of being either the native OS of the underlying physical computer, or the OS (or other system-level software) that handles actual I/O operations, takes faults and interrupts, etc. The hardware 100 and the OS 220, together, are responsible for executing VM-issued instructions and transferring data to and from the actual, physical memory 120 and the storage devices 140.

The virtualization software may take the form of a virtual machine monitor (VMM) 500, which is usually a "thin" piece of software that runs directly on top of a host, or directly on the hardware, and virtualizes all, or at least some subset of, the resources of the machine. A virtual machine monitor may also be referred to as a hypervisor. This patent generally uses the phrase "virtual machine monitor," although embodiments of the invention may be implemented in connection with virtualization software or virtualization logic that may not be called or considered a virtual machine monitor. Regardless of the terminology used, for purposes of this description, hypervisors, and other similar virtualization logic, are generally equivalent to a virtual machine monitor, as used herein.

The interface exported by a VMM 500 to a respective VM 300 may be the same as the hardware interface of the machine, or at least of some predefined hardware platform, so that the Guest OS 320 cannot determine the presence of the VMM. The VMM 500 also usually tracks and either forwards to the HOS 220, or itself schedules and handles, all requests by its VM for machine resources as well as handling various faults and interrupts. The general features of VMMs are known in the art and therefore need not be discussed in further detail here.

In FIG. 1, VMMs 500, . . . , 500n, are shown, acting as interfaces for their respective attached VMs 300, . . . , 300n. It would also be possible to include each VMM 500 as part of its respective VM 300, that is, in each virtual system. Moreover, it would also be possible to use a single VMM 500 to act as the interface to all VMs 300, . . . , 300n.

In some known virtualization systems, VMMs run directly on the underlying system hardware 100, and will thus act as the "real" operating system for its associated VM. In other systems, the HOS 220 is interposed as a software layer between VMMs and the hardware. Still other arrangements are possible, and known to those of ordinary skill in the art. Each VMM will typically include other software components such as device emulators that emulate the characteristics of respective physical devices. Such components, and others such as an interrupt handler, etc., are common in VMMs but are not necessary to understand embodiments of the present invention and are, therefore, not illustrated or described here.

One advantage of virtualization is that each VM can be isolated from all others, and from all software other than the VMM, which itself will be transparent to the VM; indeed, as above, the user of a VM may be completely unaware that it is not a "real" computer. The VMM controls the mapping from Guest physical addresses to machine addresses (which may also be called host physical addresses). As a result, a change in mapping of Guest physical addresses to machine addresses can be accomplished in a manner that is transparent to the VM, and that does not require modifications to the Guest Operating System.

A kernel 720 may be configured to function as a common interface between all VMMs and the HOS 220. The kernel 720, however, may instead be configured so as to act as, and thus effectively to replace, the HOS itself with respect to scheduling of system resources and interrupt handling. In FIG. 1, the kernel 720 is shown as being a part of system software 200 along with the HOS 220 merely for the sake of illustration; both configurations are possible according to embodiments of the invention. In other patents owned by VMware, Inc., the assignee of this patent, a similar reference has been made to hosted virtualization systems and unhosted or kernel-based virtualization systems.

In the following description of embodiments of the present invention, merely for the sake of simplicity, only one VM/VMM pair is discussed. The discussion applies equally, however, to all such VM/VMM pairs that may be included in any given implementation.

The applications 360 (and any other virtual component that runs on the Guest OS) typically address virtual memory, just as in a "real" computer. The Guest OS 320 maps virtual page numbers (VPN) to what it "believes" are machine page numbers, referred to as Guest physical page numbers (PPN). An additional mapping from PPN to actual machine memory page (MPN) must, therefore, take place in order to associate a given VPN with the actual machine memory page MPN. The VPN-to-PPN mapping takes place within the VM 300 (usually under full control of the Guest OS). A memory mapping module 510 in the VMM 500 maintains multiple memory maps or tables, which may be designed as any other memory page map.

It should be noted that the address mapping terminology used in this patent and the address mapping terminology used in some other patents owned by the assignee of this patent may differ from each other. In some other patents owned by the assignee of this patent, virtual page numbers (VPNs) have been referred to as Guest Virtual Page Numbers or "GVPNs," Guest physical page numbers (PPNs) have been referred to as Guest Physical Page Numbers or "GPPNs," and machine page numbers (MPNs) have been referred to as Physical Page Numbers or "PPNs." The concepts, however, are well understood by one of ordinary skill in the art irrespective of the labels that may be used.

In order to understand the embodiments of the present invention, the virtual to physical (machine) mapping in a virtualization system, such as the ESX virtualization product from VMware, Inc. of Palo Alto, Calif. will now be generally described.

In a physical, i.e., actual machine or system, page tables translate virtual memory addresses into physical (machine) memory addresses. Within a virtual machine, the guest operating system's page tables maintain the mapping from guest virtual pages to guest physical pages.

The ESX virtualization product virtualizes guest physical memory by adding an extra level of address translation. The VMM for each virtual machine maintains a mapping from the guest operating system's physical memory pages to the actual (machine) memory pages on the underlying machine, i.e., the hardware.

As a result of this mapping, each virtual machine sees a contiguous, zero-based, addressable physical memory space. The underlying machine memory on the server used by each virtual machine is not, however, necessarily contiguous.

The VMM intercepts guest instructions that manipulate guest operating system memory management structures (e.g. guest page tables) so that the memory management structures actually used by the memory management unit (MMU) on the processor (e.g. the shadow page tables) are not updated directly by guest software. The ESX virtualization product host maintains the virtual-to-machine page mappings in shadow page tables that are kept up to date with the physical-to-machine mappings maintained by the VMM and with the virtual-to-guest physical mappings maintained by the guest OS. The shadow page tables are then used directly by the processor's MMU.

This approach to address translation allows normal memory accesses in the virtual machine to execute without adding address translation overhead, once the shadow page tables are set up. Because the translation look-aside buffer (TLB) on the processor caches direct virtual-to-machine mappings read from the shadow page tables, no additional overhead is added by the VMM to access the memory for many memory accesses.

Figure 2:
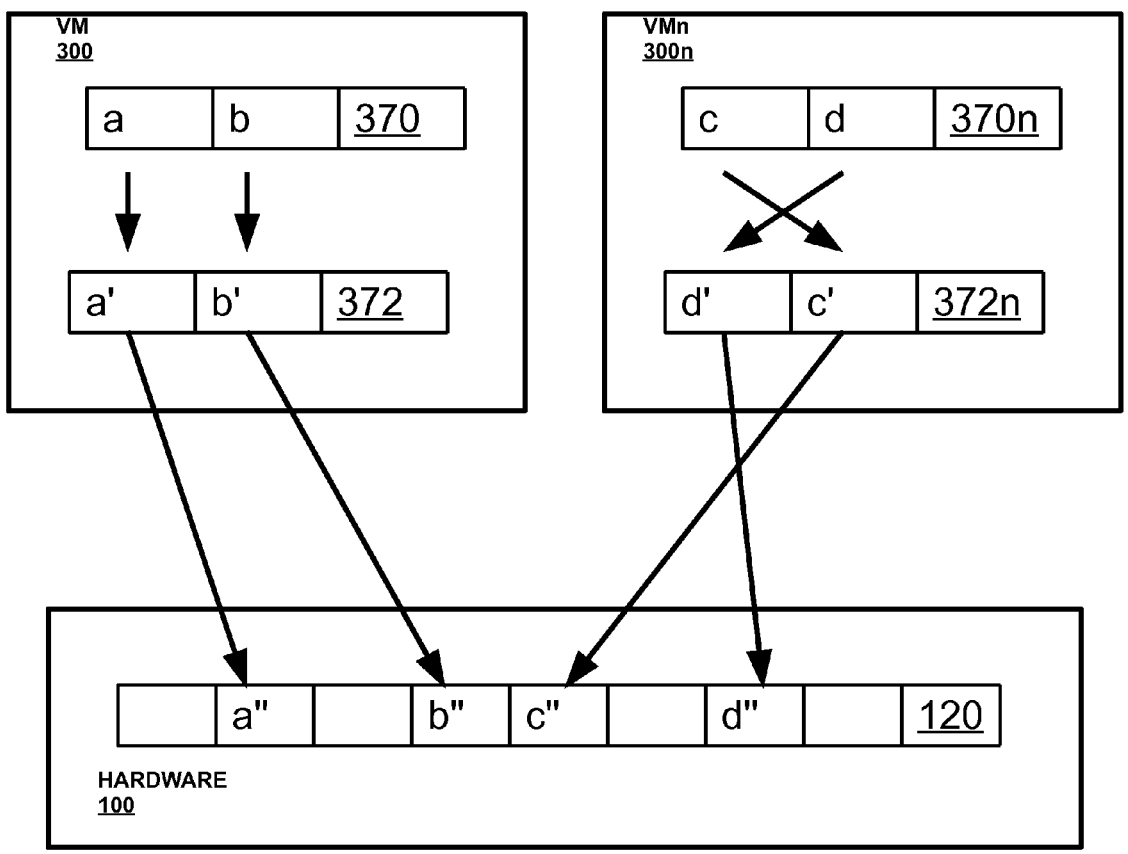
FIG. 2 is a conceptual block diagram of a page table system.

Referring now to FIG. 2, first and second virtual machines (VM) 300, 300n include respective guest virtual memories 370, 370n. Each virtual memory 370, 370n is divided into pages. In addition, respective guest physical memories 372, 372n are provided. Conceptually, pages in the virtual memories 370, 370n are mapped to corresponding pages in the physical memories 372, 372n, as represented by the arrows. Thus, for example:

a→a'
b→b'
c→c'
d→d'

Further, the pages in the guest physical memory 372 are mapped to the machine memory 120 on the underlying hardware 100. Thus, for example:

a'→a"
b'→b"
c'→c"
d'→d"

A mapping from guest virtual memory to machine memory is provided in the shadow page tables maintained by the VMM. The underlying processor running the virtual machine uses the shadow page table mappings for accessing memory locations.

Advantageously, because of the extra level of memory mapping introduced by virtualization, memory access across all virtual machines can be efficiently managed.

Generally, virtual memory management by the virtualization software is performed without the knowledge of the guest operating system and without interfering with the guest operating system's own memory management subsystem.

Figure 3:
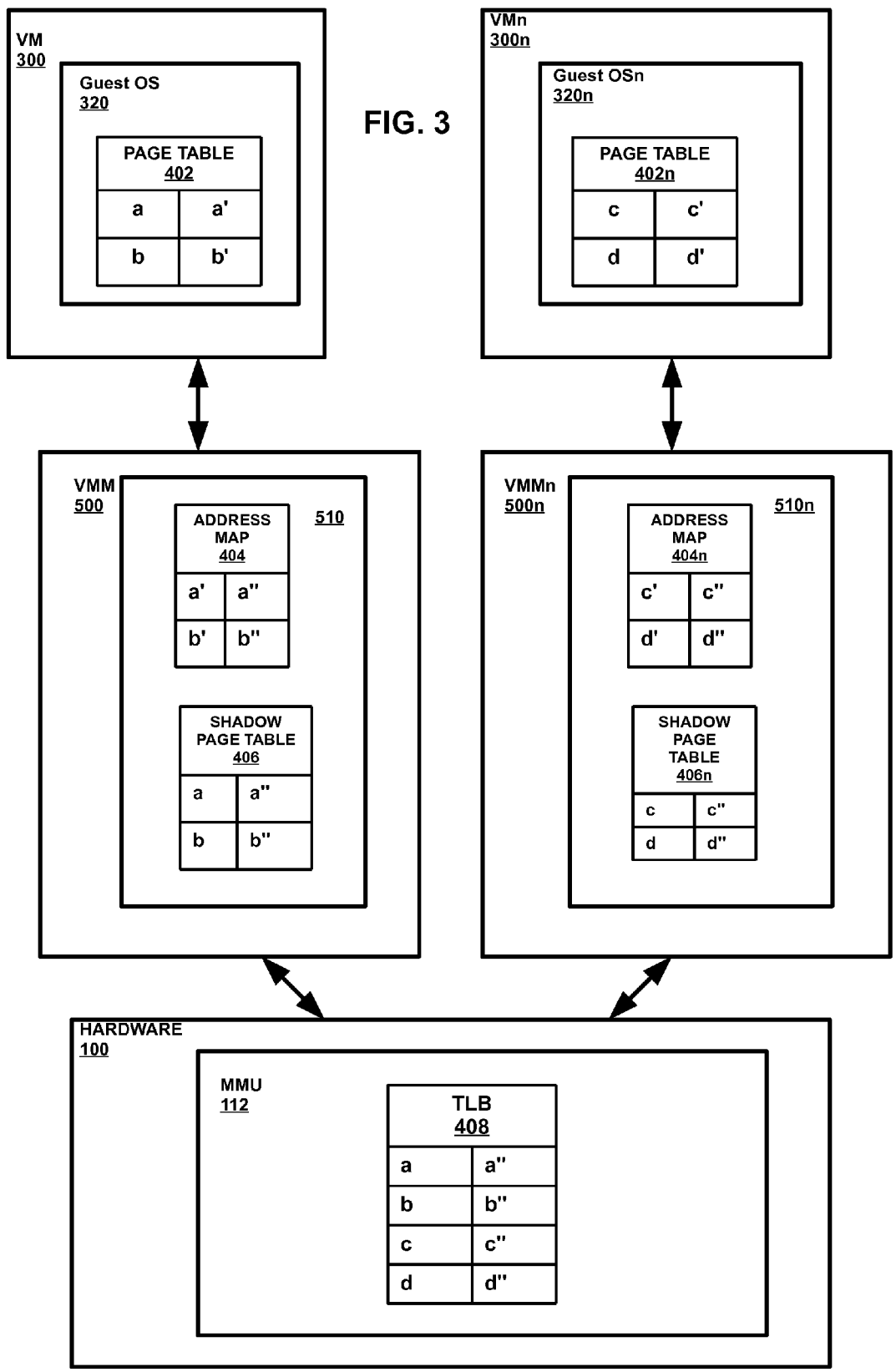
FIG. 3 is a block diagram of an implementation of a shadow page table system.

Referring now to FIG. 3, corresponding to the example in FIG. 2, each virtual machine 300, 300n includes a corresponding GuestOS 320, 320n with a corresponding page table 402, 402n. The entries in the page table 402, 402n map the respective guest's virtual memory to physical memory.

The respective memory mapping module 510, 510n for each VMM 500, 500n maintains a mapping table 404, 404n of the guest physical memory to the hardware or machine memory location on the underlying hardware system. Thus, for example:

a'→a"
b'→b"
c'→c"
d'→d"

is stored in the appropriate mapping tables 404, 404n.

The VMM 500, 500n maintains a shadow page table 406, 406n mapping the guest virtual memory to the underlying physical memory. Thus, for example:

a→a"
b→b"
c→c"
d→d"

is stored in the appropriate shadow tables 406, 406n.

The guest OS continues to control the mapping of virtual addresses to the guest physical memory addresses, but the guest OS does not have direct access to mappings for the actual machine memory. The VMM 500, 500n is responsible for mapping guest physical memory to the actual machine memory. The VMM 500, 500n also creates and maintains the shadow page tables, containing mappings from guest virtual memory to actual machine memory, for use by MMU 112. As in FIG. 3, the MMU 112 uses TLB hardware 408 to cache mappings from the shadow page tables, from the guest virtual memory directly to the machine memory, to accelerate the translation process. When the guest OS changes its virtual memory to physical memory mappings, the VMM updates the shadow page tables 406, 406n to enable a direct lookup.

"A Comparison of Software and Hardware Techniques for x86 Virtualization" by Adams and Agesen, ASPLOS 2006, Oct. 21-25, 2006, San Jose, Calif., (hereafter "the Adams paper,") the entire contents of which are incorporated by reference herein for all purposes, describes memory virtualization in products available from VMware.

As described in Sections 2.2-2.4 of the Adams paper, mechanisms are provided to keep a "shadow" data structure 406, 406n synchronized with a "primary" data structure, e.g., the page table 402, 402n.

To maintain coherency of the shadow page tables with the information in the guest page tables, a VMM typically uses hardware page protection mechanisms to trap accesses to the primary structures. For example, guest page table entries (PTEs) for which shadow PTEs have been constructed may be write-protected. This page-protection technique is known as tracing. The VMM handles a trace fault similarly to a privileged instruction fault: by decoding the faulting guest instruction, emulating its effect in the primary structure, and propagating the change to the shadow structure.

The VMM uses traces to prevent its shadow tables from becoming incoherent with respect to the guest tables. The resulting trace faults can themselves be a source of overhead, however, and it would be desirable to reduce the amount of trace faults or remove shadow tables when they are no longer needed, thus freeing up memory for other uses.

When a process exits in a guest operating system, the guest operating system writes not-present PTEs (mostly zeros) into the guest page tables as part of the process exit. The VMM takes traces during these writes and hence it incurs an overhead. This is observed especially in compile workloads and shell scripts in which a lot of processes are created and destroyed in a short span of time.

In several of the most popular modern operating systems, when a process exits, the operating system tears down, destroys or eliminates page tables for the process beginning at the minimum virtual address used by the process. A process typically has access to some range of virtual addresses from some minimum virtual address to some maximum virtual address, although this virtual address range is not necessarily contiguous. One embodiment of this invention uses the fact that, when a process exits, the operating system begins tearing down page tables beginning at the minimum virtual address to determine when a process exit has occurred and so the shadow page tables are no longer needed. In accordance with this embodiment of the present invention, a minimum virtual address value, as has been accessed or identified by a process up to that time, is maintained in the shadow page table metadata structure corresponding to an address space. This information may be updated whenever a trace fault is received on a page whose page table entry (PTE) changes from not-present to present or whenever a hidden page fault, i.e., a miss in the shadow page table when there is a corresponding PTE in the guest page table, is received. In addition, a flag is maintained that indicates whether an operating system has started destroying the page tables of a process. Initially this flag is set to False and subsequently set to True whenever it is detected that a page table entry corresponding to the minimum virtual address accessed by a process is being changed from present to not present. From that point on, whenever a present to not-present transition on a guest page table entry corresponding to this process is detected, the trace on the guest page table and also the shadow page table page are removed. However, it is possible that this process can incorrectly conclude that the page tables for a process are being destroyed. To account for this possibility, if a conclusion has been reached that the page tables for a process are being destroyed, but then there is an update to a PTE for that process that does not involve a change from present to not-present, then it is assumed that the page tables for the process are not being destroyed, the flag is set to False again, and traces on guest page tables and shadow page table pages are not removed anymore.

As an example, when this heuristic was implemented on an ESX virtualization system from VMware, the measured performance of the following benchmarks on Linux (kernel 2.6.18, 64-bit, UP, 3 GB) and also Windows 2003 server (64-bit, UP, 3 GB) improved. An existing VMM was modified to implement an embodiment of this invention, and the benchmarks indicated below were run on both the unmodified VMM and the modified VMM, producing the results indicated below. Advantageously, measurements showed that the time needed to complete each of these benchmarks was reduced.

Results on Linux Guest:

| Benchmark | Unmodified VMM (Secs) | Modified VMM (Secs) |
| --- | --- | --- |
| Apache Compile | 211 | 184 |
| Kernel Compile | 475 | 457 |
| Fork-Wait | 72 | 60 |
| Shell Counting | 150 | 120 |

Results on Windows Guest:

| Benchmark | Unmodified VMM (Secs) | Modified VMM (Secs) |
| --- | --- | --- |
| Apache Compile | 144 | 124 |
| Fork-wait | 78 | 66 |

In addition, according to the statistics counters, implementing this heuristic also eliminated approximately 75% of all present to not present trace faults for these workloads and approximately 25% of overall traces for these workloads.

Figure 4:
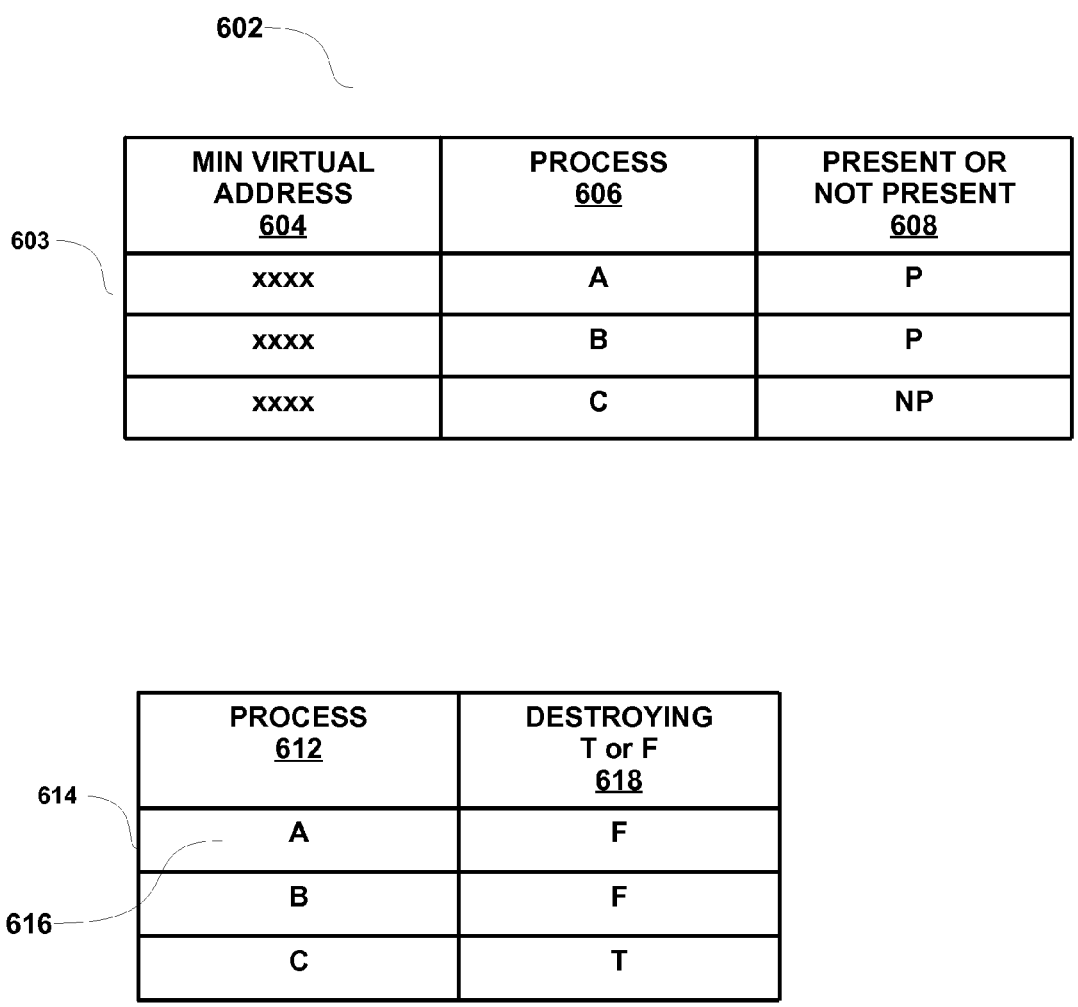
FIG. 4 is a block diagram in accordance with one embodiment of the present invention.

In accordance with this first embodiment, in one implementation, and referring now to FIG. 4, a first table 602 is provided having entries 603 where each entry has a minimum virtual address portion 604, a corresponding process portion 606 and a corresponding indication of present or not-present 608. Further, a second table 616 includes one or more entries 614 having a process portion 612 corresponding to a destroying portion 618 as indicated by a logic True or False condition. Of course, one of ordinary skill in the art will understand that there is any number of data structures that can be used to maintain and keep track of this information in accordance with the teachings described herein. The representation of the tables 602, 616, as shown in FIG. 4 is merely for the purposes of explanation and not intended to be limiting.

Figure 5:
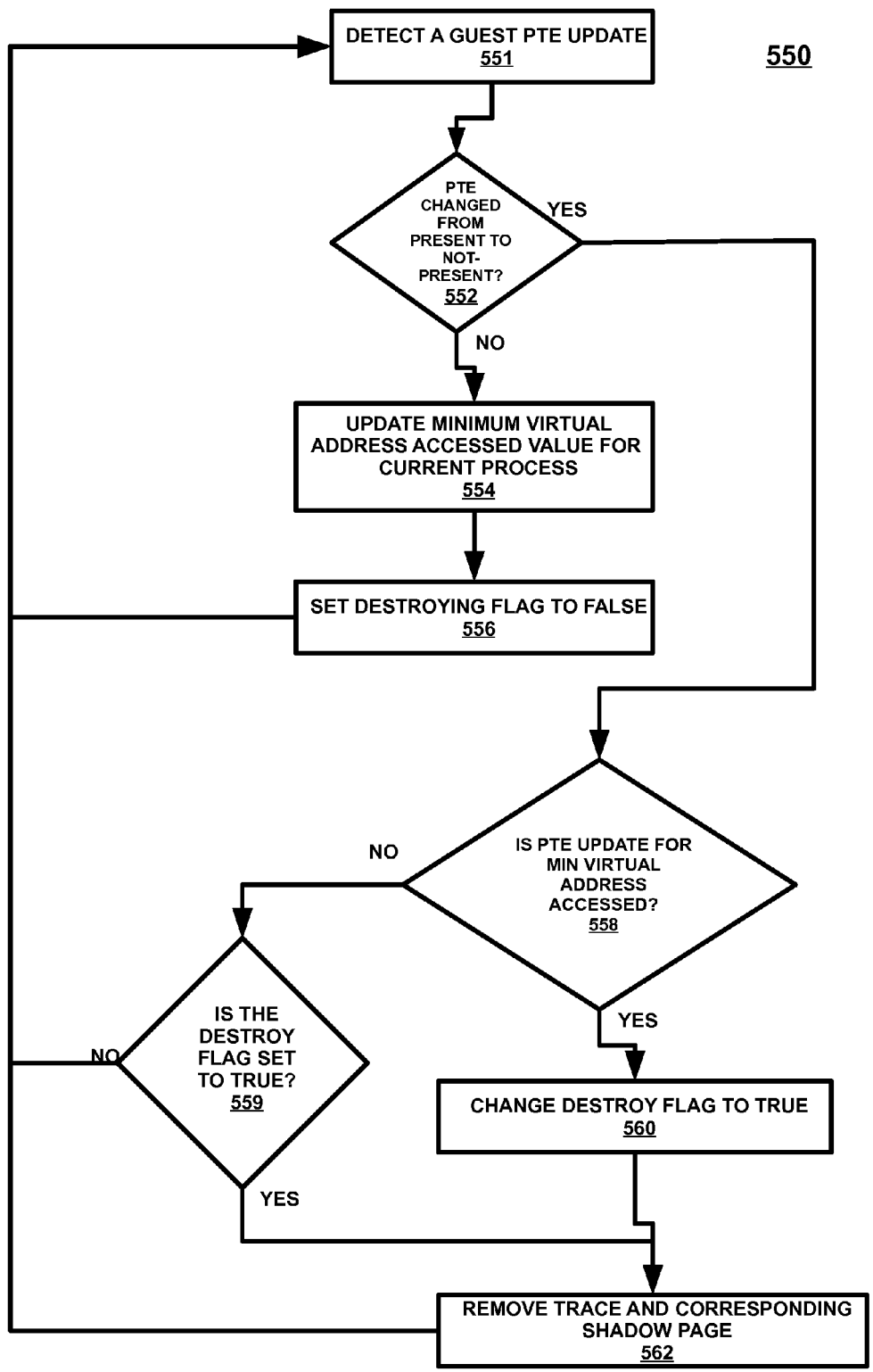
FIG. 5 is a flowchart of a method corresponding to the embodiment shown in FIG. 4.

Turning now to FIG. 5, a method 550 in accordance with the first embodiment includes waiting for a guest PTE update to occur, step 551, and then, step 552, determining whether or not a page table entry has changed from present to not present. If a page table entry has not changed from present to not-present then control passes to step 554 where a minimum virtual address value accessed by the process may be updated. If the update to the page table entry involves changing the entry from not-present to present, and the virtual address mapped by the page table entry is lower than the current minimum virtual address value, then the minimum virtual address value is set to the virtual address value mapped by the new page table entry. As indicated above, the minimum virtual address value may also be updated on a hidden page fault, if the mapping found in the guest page table in response to the page fault is for a virtual address that is lower than the current minimum virtual address value. At step 556 the corresponding destroying flag 618 is set to False. As indicated above, if the destroying flag 618 was set to True and an update is made to a PTE for the process that does not involve changing from present to not-present, then the conclusion that the page tables for the process are being destroyed is reversed and the destroying flag 618 is set back to False. Control then passes back to step 551 to wait for a guest PTE update to occur.

Returning now to step 552, if a PTE is changed from present to not-present then control passes from step 552 to step 558. At step 558 it is determined if the updated PTE (from present to not-present) maps the minimum virtual address accessed for the current process, as indicated by the minimum virtual address value 604. If the update is for the minimum virtual address accessed for the current process then control passes to step 560 where the corresponding process destroy flag is changed from False to logical True. Subsequently, step 562, the corresponding trace and shadow page table page are removed, thus freeing up memory space, and control returns to step 551 to wait for a guest PTE update to occur.

Returning now to step 558, if the PTE update from present to not-present is not on the minimum virtual address accessed for the current process then control passes to step 559 where it is determined if the destroy flag has been previously set to True. If the destroy flag has been set to True then control passes to step 562 and operation continues as above. If, on the other hand, the destroy flag is not set to True, then control returns to step 551.

In accordance with a second embodiment of the present invention, consecutive present to not-present PTE transitions in time are tracked for guest page tables on a per address space basis. This data is then used to identify an address space that is being destroyed, e.g., written over with all zeroes, as a corresponding application or context is ending. In one embodiment, as a non-limiting example, when at least two (2) guest page tables each has, in one non-limiting example, at least four (4) consecutive present to not-present PTE transitions in time, a flag is set identifying the potential destruction of the address space. Once it is determined that the address space could be in the process of being destroyed, i.e., the flag has been set, any further present to not-present PTE transition event in the address space on any of the guest page tables corresponding to the address space leads to the shadow page table page and trace being dropped on the corresponding guest page table incurring the event.

At any time, however, when there is a valid condition, e.g., a guest PTE transition (either from not-present to present or present to present), or if guest demand faults pages, the flag is cleared and the information regarding the address space is reset. As a result, the process of identifying address space exit starts over again.

Referring now to FIG. 6, in an implementation of the second embodiment, first and second guest page tables 652, 654 are provided. In the first guest page table 652, a page table entry 656 includes a first portion 658 and a present/not-present portion 660. Similarly, in the second guest page table 654, a page table entry 662 includes a first portion 664 and a corresponding present/not-present portion 666.

A third table 668 includes a plurality of entries 670, 672 with each entry 670, 672 having a guest page table identifier portion 674 and a corresponding portion 676 that indicates whether or not the guest page table has been identified as having X consecutive not-present transitions in time. As discussed above, and as will be set forth in more detail below, this table 668 will be used to identify an address space that may be in the process of being destroyed.

Figure 7:
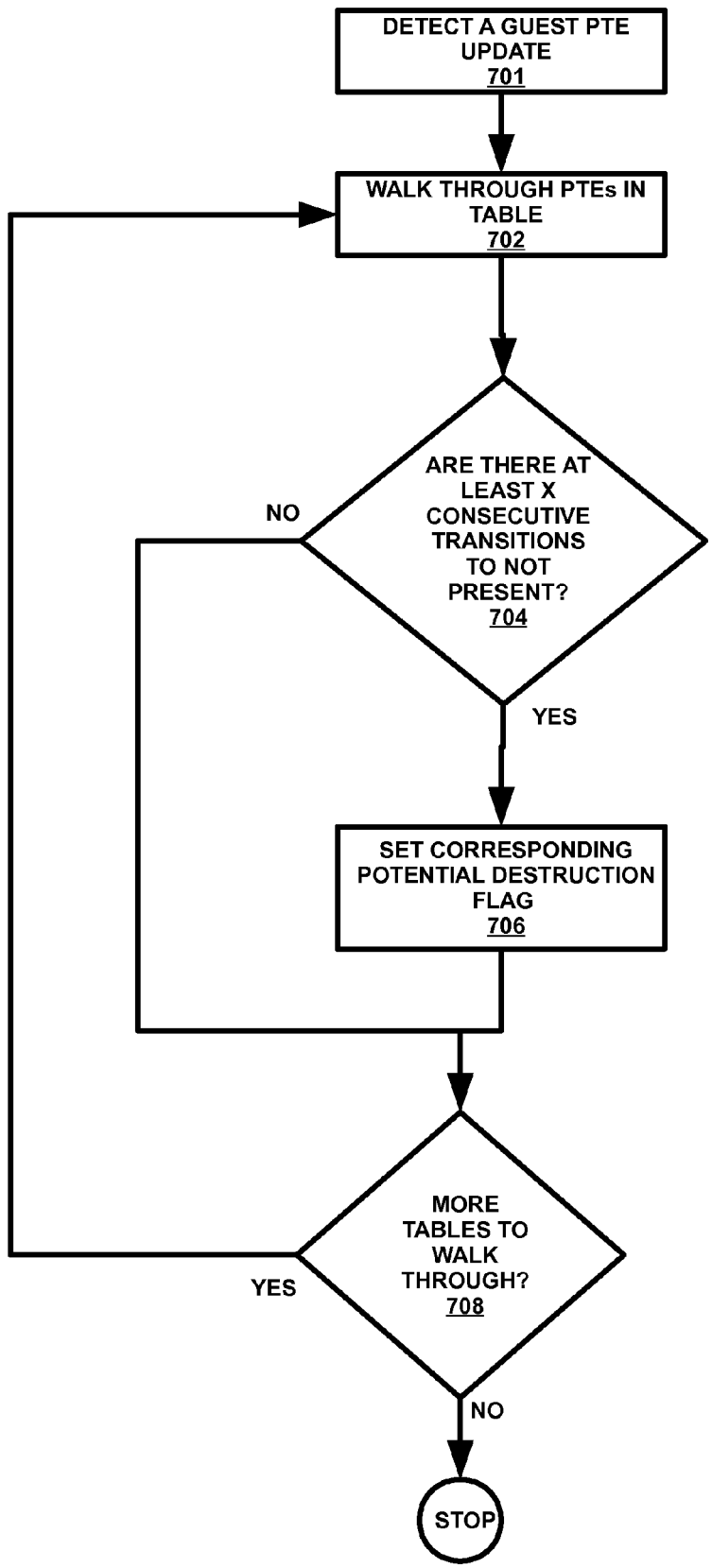
FIG. 7 is a flowchart of one portion of a method corresponding to the embodiment shown in FIG. 6.

In accordance with the implementation of the second embodiment, referring now to FIG. 7, a method 700 begins, step 701, with waiting for a guest PTE update to occur and then, at step 702, walking through the page table entries in a given table, for example, the first guest page table 652. At step 704, it is determined if there are at least X, consecutive in time (typically ends up being consecutive in sequence as well), present to not-present transitions where X may be set to four (4), for example. If the condition at step 704 is true then control passes to step 706 where the potential destruction flag corresponding to the page table is set. At step 708 it is determined whether or not there are more page tables that need to be walked through. If so, control passes back to step 702 for each of the remaining page tables to be processed.

Figure 8:
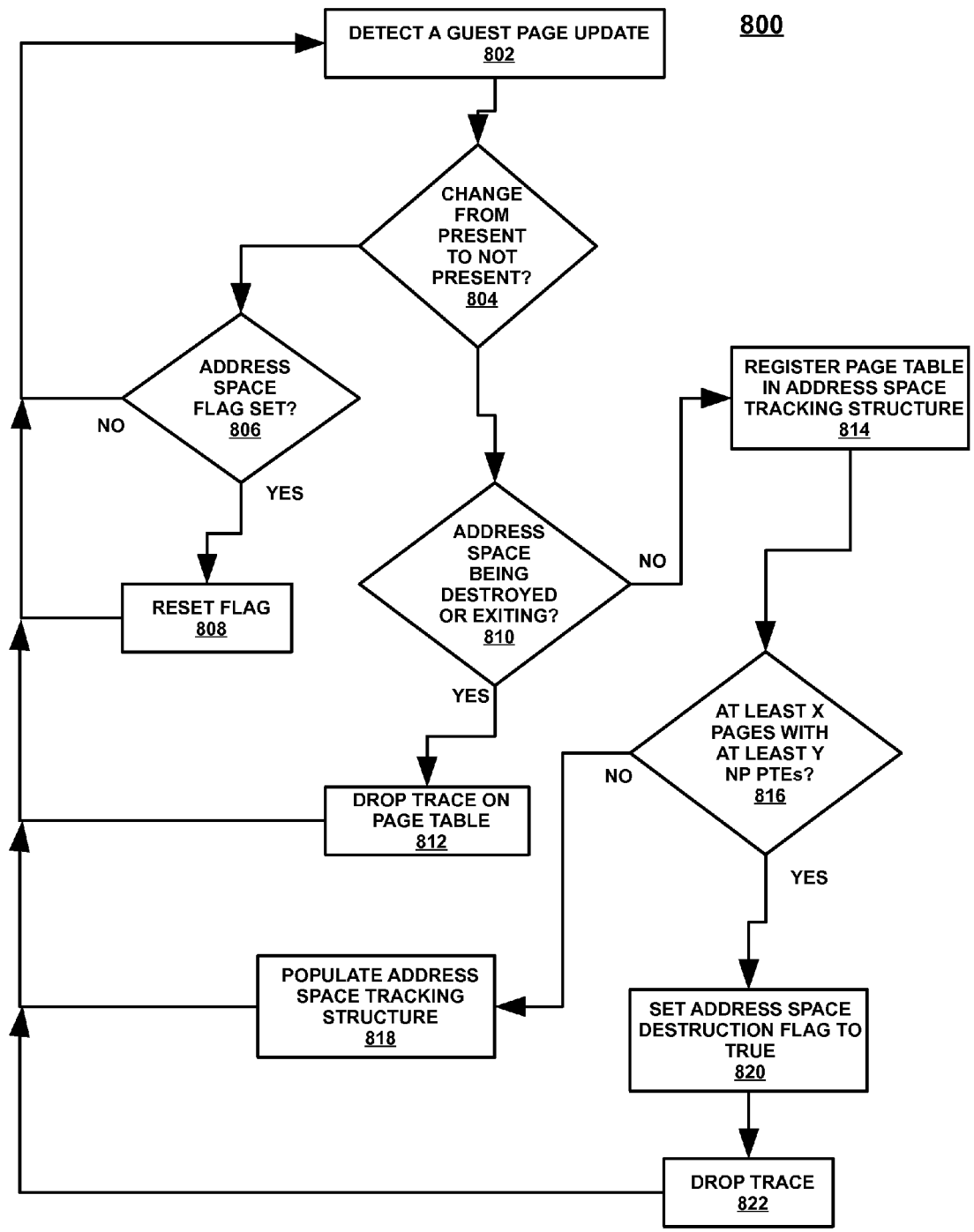
FIG. 8 is a flowchart of another portion of the method corresponding to the embodiment shown in FIG. 6.

Referring now to FIG. 8, and further in accordance with the second embodiment, a process 800 begins at step 802 where a transition of a page table entry in a "triggering" page table is detected. Subsequently, step 804, it is determined whether or not the page table entry is going from present to not present and if the answer is NO then control passes to step 806. At step 806 it is determined whether or not the address space flag has been set indicating that the address space is being exited or destroyed. If the flag is not set then control passes back to step 802. If, on the other hand, the address space flag is set then control passes to step 808 where the flag is reset and subsequently control passes back to step 802.

Returning to step 804, if it is determined that the page table entry update is going from present to not present then control passes to step 810 where it is determined whether or not the address space is in the process of being destroyed or exited, e.g. it is determined whether the address space flag is set. If this is the case, then control passes to step 812 where the trace on the page table is dropped and the corresponding shadow page table page is removed with control subsequently returning to step 802.

If, at step 810, the address space is not in the process of being destroyed or being exited, control passes to step 814 where the page table is registered in the address space tracking structure, e.g. in the third table shown in FIG. 6. Subsequently, step 816, it is determined whether or not there now are at least X page tables with at least Y consecutive table entries that are indicated as being not present. This step may be accomplished, for example, using the method 700 of FIG. 7. If the condition is not TRUE then control passes to step 818 where the address space tracking structure is populated with the information regarding the page table and control returns to step 802.

If, at step 816, it is determined that there are at least X page tables with at least Y consecutive page table entries that are not present, then control passes to step 820 where the address space destruction flag for the corresponding address space is set to yes and then at step 822 the trace is dropped and the shadow page table page is removed subsequent to which control passes back to step 802.

The two specific embodiments described above are two of many possible implementations of a more general embodiment of the invention. More generally, virtualization logic makes a determination that a guest operating system is destroying guest page tables for an address space. This determination may be made in a variety of ways. In the first embodiment described above, virtualization logic reaches this conclusion upon detecting a present to not-present transition in a guest page table entry for a minimum virtual address. More generally, the virtualization logic detects a guest page table entry for a minimum virtual address changing from a valid state to an invalid state, which could be represented by a present to not-present transition or by various other means. In the second embodiment described above, virtualization logic reaches this conclusion upon detecting that a first predetermined number of guest page table pages has had a second predetermined number of consecutive present to not-present transitions. This determination can be made in various other ways as well; for example, in a paravirtualized system, the guest operating system may directly notify the virtualization logic that a process is exiting. Once this determination is made, and so long as the conclusion stands, traces on guest page table pages are removed and/or corresponding shadow page table pages are removed, optionally in response to subsequent present to not-present transitions in the guest page tables for the process. The determination that the guest page tables for an address space are being destroyed can be reversed and the process of removing traces on guest page table pages and removing corresponding shadow page table pages can be terminated. For example, if the virtualization logic determines that the guest operating system has modified a guest page table entry for the address space from not-present to present or from present to present, then the guest operating system is probably not destroying the page tables for the address space, despite the earlier conclusion that it was.

The foregoing embodiments of the present invention may be implemented on one or more of the products available from VMware, Inc. of Palo Alto, Calif.

Embodiments of the above-described invention may be implemented in all software, all hardware, or a combination of hardware and software, including program code stored in a firmware format to support dedicated hardware. A software implementation of the above described embodiment(s) may comprise a series of computer instructions fixed on a tangible medium, such as a computer readable medium, e.g. diskette, CD-ROM, ROM, or fixed disk. The series of computer instructions embodies all or part of the functionality previously described herein with respect to the embodiment of the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. In a system comprising virtualization logic and a corresponding virtual machine (VM) running a first process, a method comprising:
 the virtualization logic maintaining an accessed minimum virtual address location corresponding to the first process running in the virtual machine;
 the virtualization logic maintaining an exit indicator for the corresponding first process indicating whether the first process is exiting, the exit indicator initially indicating that the first process is not exiting;
 the virtualization logic detecting that a page table entry corresponding to the accessed minimum virtual address location for the first process has changed from a valid status to an invalid status and, in response, the virtualization logic setting the exit indicator for the first process to indicate that the first process is exiting; and
 the virtualization logic, upon detecting a change in a first page table entry for the first process from a valid status to an invalid status, if the exit indicator for the first process indicates that the first process is exiting, deleting a trace on a page table page containing the first page table entry.

2. The method of claim 1, further comprising:
 the virtualization logic, upon detecting a change in a first page table entry for the first process from a valid status to an invalid status, if the exit indicator for the first process indicates that the first process is exiting, deleting a shadow page table page corresponding to the page table page containing the first page table entry.

3. The method of claim 1, further comprising:
 the virtualization logic maintaining the minimum virtual address location in a shadow page table meta-data structure.

4. The method of claim 1, further comprising:
 if, subsequent to the exit indicator for the first process being set to indicate that the first process is exiting, the virtualization logic detects a change in a page table entry for the first process from an invalid state to a valid state, setting the exit indicator for the first process to indicate that the first process is not exiting.

5. The method of claim 1, further comprising:
 if, subsequent to the exit indicator for the first process being set to indicate that the first process is exiting, the virtualization logic detects a change in a page table entry for the first process that does not affect the validity of the page table entry, setting the exit indicator for the first process to indicate that the first process is not exiting.

6. In a system comprising virtualization logic and a corresponding virtual machine (VM) in which a first process is running and which has corresponding page tables, a method comprising:
 the virtualization logic maintaining at least one trace and at least one shadow page table, each related to the first process;
 the virtualization logic maintaining a data structure comprising a minimum virtual address value corresponding to the first process;
 the virtualization logic identifying the page tables of the first process as beginning to be destroyed when a status of a page table entry corresponding to the accessed minimum virtual address changes from a valid state to an invalid state; and
 the virtualization logic deleting the at least one trace and the at least one shadow page table once the page tables of the first process have been identified as beginning to be destroyed.

7. A method of freeing up memory resources in a virtualization system comprising virtualization logic and a corresponding virtual machine (VM) running guest code, the method comprising:
 the guest code maintaining a guest page table comprising page table entries mapping guest virtual memory locations to guest physical memory locations for at least one process in the virtual machine;
 the virtualization logic maintaining a shadow page table comprising page table entries mapping the guest virtual memory locations in the guest page table to machine memory locations;
 the virtualization logic running a trace to monitor changes in the guest page table to synchronize the shadow page table with the guest page table;
 the virtualization logic maintaining a data structure that correlates an accessed minimum virtual address for each at least one process; and
 the virtualization logic deleting a trace and corresponding shadow page table when it is determined that a status of a guest page table entry corresponding to the accessed minimum virtual address has changed from a valid status to an invalid status.

8. The method of claim 7, further comprising:
 the virtualization logic determining that the status of the guest page table entry corresponding to the accessed minimum virtual address has changed from present to not-present.

9. In a system comprising virtualization logic and a corresponding virtual machine (VM) running a guest operating system (OS), a method comprising:
 the virtualization logic monitoring state transitions of page table entries (PTEs) in a plurality of page tables associated with the guest OS, each page table associated with an address space;
 the virtualization logic identifying a first address space as a candidate for destruction where a first predetermined number of PTE state transitions of a first type are detected in each of a second predetermined number of page tables associated with the first address space; and
 the virtualization logic, after the first address space has been identified as being a candidate for destruction and upon detection of a page table entry having a state transition of the first type in a triggering page table associated with the first address space, deleting a shadow page table associated with the triggering page table.

10. The method of claim 9, wherein the triggering page table is one of the second predetermined number of page tables.

11. The method of claim 9, wherein the triggering page table is not one of the second predetermined number of page tables.

12. The method of claim 9, wherein the first type of state transition is from present to not-present.

13. The method of claim 9, the method further comprising:
 the virtualization logic identifying the first address space as a candidate for destruction when the first predetermined number of PTE state transitions are consecutive.

14. In a system comprising virtualization logic and a corresponding virtual machine (VM) running a guest operating system (OS), a method of freeing memory resources comprising:
- the virtualization logic detecting a state transition of a page table entry (PTE) in a page table associated with the guest OS, the page table associated with an address space;
- the virtualization logic determining if the detected state transition of the PTE is from a first state to a second state;
- if it is determined that the detected state transition of the PTE is from the first state to the second state, then the virtualization logic determining if the address space corresponding to the page table is already identified as being destroyed;
- if the address space has not already been identified as being destroyed, then the virtualization logic determining if, for the address space, at least X page tables have at least Y PTEs that have transitioned to the second state; and
- if there are at least X page tables having at least Y PTEs that have transitioned to the second state, the virtualization logic identifying the address space as being destroyed.

15. The method of claim 14, the method further comprising:
- the virtualization logic discontinuing a trace corresponding to the address space.

16. The method of claim 14, the method further comprising:
- the virtualization logic setting X=2.

17. The method of claim 14, the method further comprising:
- the virtualization logic setting Y=4.

18. The system of claim 14, wherein:
- the first state is a present state; and
- the second state is a not-present state.

* * * * *